United States Patent
Ammons et al.

(10) Patent No.: US 7,267,506 B1
(45) Date of Patent: Sep. 11, 2007

(54) TOOL FOR INSTALLING AN UNDERGROUND WATER PIPE

(76) Inventors: James E. Ammons, 1420 Lawrence Rd., Kemah, TX (US) 77565; Taylor Allan Ammons, 1420 Lawrence Rd., Kemah, TX (US) 77565; Ronald Allan Ammons, 1420 Lawrence Rd., Kemah, TX (US) 77565

( * ) Notice: Subject to any disclaimer, the term of this patent is extended or adjusted under 35 U.S.C. 154(b) by 0 days.

(21) Appl. No.: 11/510,477

(22) Filed: Aug. 25, 2006

Related U.S. Application Data

(63) Continuation-in-part of application No. 11/217,506, filed on Sep. 1, 2005.

(51) Int. Cl.
*F16L 1/028* (2006.01)
(52) U.S. Cl. .............. 405/184; 405/154.1; 405/174
(58) Field of Classification Search ........... 405/154.1, 405/174, 184, 245; 173/90; 227/147; 175/22, 175/23; 111/101, 106, 115; 294/49, 55
See application file for complete search history.

(56) References Cited

U.S. PATENT DOCUMENTS

| | | | | |
|---|---|---|---|---|
| 51,801 A | * | 1/1866 | Castle | ................... 175/23 |
| 790,910 A | * | 5/1905 | McClintock | .............. 405/245 |
| 2,612,725 A | * | 10/1952 | Casey | ................... 111/101 |
| 2,686,073 A | * | 8/1954 | Benoist | ................. 111/101 |
| 3,916,564 A | * | 11/1975 | Crowell, Sr. | ............. 175/23 |
| 6,374,758 B1 | * | 4/2002 | Mickle et al. | ........... 111/106 |

FOREIGN PATENT DOCUMENTS

EP  0 294 740  * 12/1988

* cited by examiner

*Primary Examiner*—Frederick L. Lagman
(74) *Attorney, Agent, or Firm*—Buskop Law Group, PC; Wendy Buskop

(57) ABSTRACT

A tool for installing water pipe made of a central body, a ring encircling the central body, a tapered end, and an anvil end. Water pipe slides over the tapered end, over the ring and is stopped by the anvil in for impact installation in soil enabling water pipe to be installed beneath an immovable structure by impacting the anvil end.

21 Claims, 4 Drawing Sheets

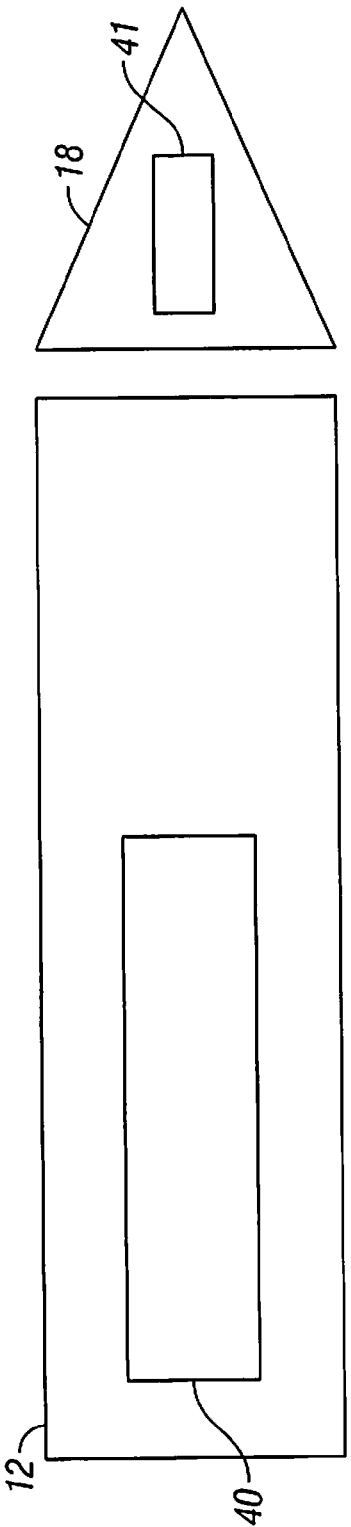
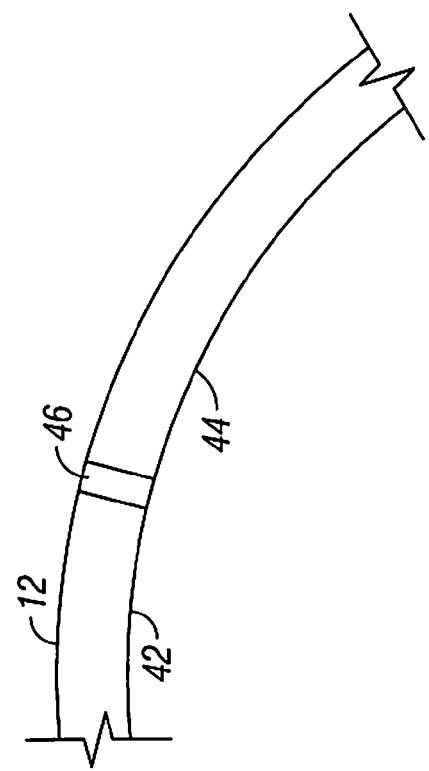

TOOL FOR INSTALLING AN UNDERGROUND WATER PIPE

CROSS REFERENCE TO RELATED APPLICATIONS

The present application is a Continuation-in-Part of co-pending U.S. patent application Ser. No. 11/217,506; Entitled "Tool and Method for Installation of Water Pipe" filed on Sep. 1, 2005.

FIELD

The present embodiment relates to handheld tools for use in connection with the installation of water pipe under immovable objects, such as a slab of concrete, for subsequent connection to another pipe or to a portion of a water or irrigation system. The tool positions water pipe and installs water pipe beneath hard immovable structures.

BACKGROUND

Water systems have long been proved to be an effective and efficient means for watering landscaping, especially in hot, dry climates. A need has existed for a tool and a method to install water pipe, such as for irrigation, or for use in a house, under an existing driveway, walkway or other hard nonmoving object without removing the driveway, walkway or other hard nonmoving object.

The movement of clean water has become very important in developing countries. Typically, in these countries, there is no money for drilling equipment. In fact, there is barely enough money for the PVC pipe used to carry the clean water from a spring. A need has existed for a manually operable device that installs water pipe under hard nonmoving objects on the surface of the ground without digging, and without use of motor operated or gasoline operated equipment. Particularly, there is a need for this method in developing countries or in poor areas of the United States A need exists for a tool and a method to install a water pipe which is fast, easy to use, and works with preexisting structures.

A need has existed for a device that has no motor for installing water pipe in habitats where endangered species exist, and provides a tool that is quiet unlike motorized boring drills.

A need exists for a water pipe installation tool for use in laying pipe under nonmoving objects, like concrete foundations, that has few safety hazards for a worker in the installation process and which creates little noise pollution for other neighborhood residents during installation.

A need exists for a light, easy to ship hand-held device that could be used to easily install pipe for water systems of a consistent, correct diameter preventing mistakes in the water pipe installation process.

The present embodiments meet these needs.

BRIEF DESCRIPTION OF THE DRAWINGS

The detailed description will be better understood in conjunction with the accompanying drawings as follows:

FIG. 3 depicts a cross section of another embodiment of the central body of the tool.

FIG. 4 depicts an embodiment of the tool with a curved central body with an expandable central body.

Figure 1:
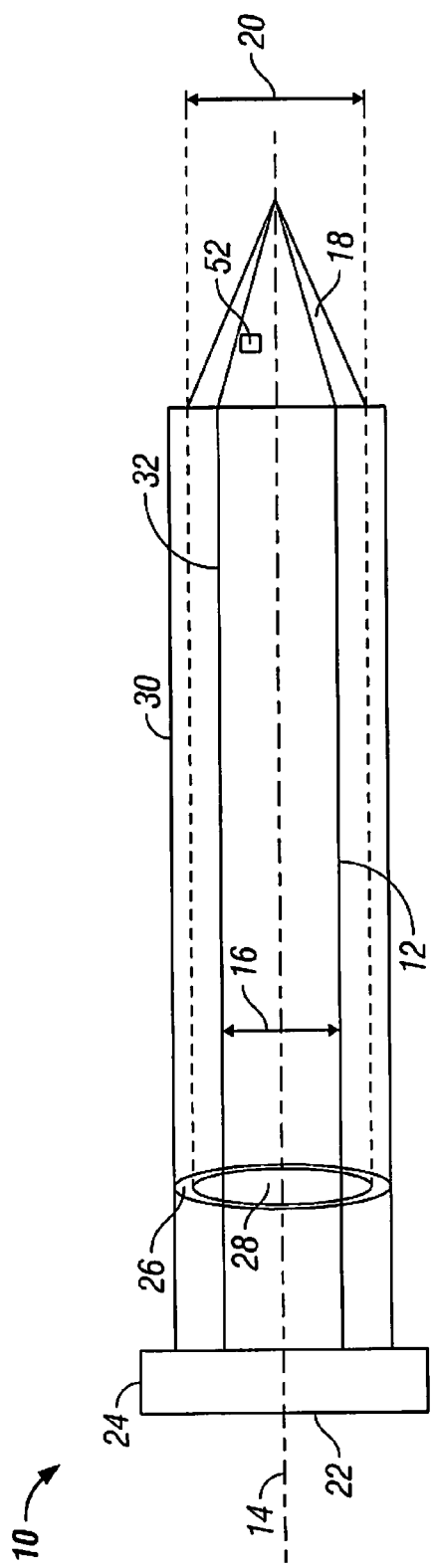
FIG. 1 depicts a top view of an embodiment of a one piece tool in a position ready for use in an installation.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The present embodiments are new and improved ways to easily and consistently install tubing beneath nonmoving objects for water systems. The nonmoving objects are contemplated to be immovable structures, such as concrete walkways, roadways, driveways, such as concrete driveways, existing water pipes, existing sewer pipes, portions of houses, portions of garages, fencing or other immovable objects. The installed tubing can be hard PVC tubing for water systems, or more flexible tubing.

The tool is designed to enable installation of water pipe under an immovable structure or nonmoving object, by traversing beneath the nonmoving object such that each end of the water pipe is accessible from either side of the nonmoving object.

The tool can be used horizontally or vertically to install water pipe without affecting the nonmoving object. The tool is designed to be selectively operated without requiring any motor, electricity, or gas, thereby, making the tool environmentally friendly.

The tool can be used in areas where noise pollution from a motorized drill or other gas powered drilling device would harm local endangered wildlife, or otherwise bother local residents.

The tool can be used to install water pipe beneath various types of nonmoving objects by carrying the water pipe over a central body portion. Thereby, only permitting impact required for installation, upon the tool anvil end rather than the water pipe. Allowing for impact to contact only the tool anvil end while traversing beneath the nonmoving object, will prevent the water pipe from cracking or breaking during installation. The nonmoving object can include a natural gas pipe, or other municipal pipes.

The tool has a central body with a tapered end, a ring around the central body, and an anvil end. In an alternative embodiment, the tool can have a hollow central body with an anvil end for installation of water pipe. In still another embodiment, the hollow tool version can have a hollow tapered end for ease of installation in difficult, particulate containing soils or in harder clays.

The tool can be a one piece tool, formed by pouring metal to create the unitary design, or it can be made from various cut pieces welded together forming a unitary tool, or it can be made from a solid anvil end, central body and tapered end with the ring moveably encircling the central body, enabling the ring to be adjustable, and even removable in the case of damage or need for a larger diameter ring, using connectors or other types of conventional fasteners.

The ring is connected around the central body between the anvil end and the tapered end. The ring can be welded to the central body, or it can be removably connected to the central body. The removably connected ring can be a sliding ring, encircling the central body so that it can not be disconnected without cutting off the central body, but slidable up and down the length of the central body and connected to the central body with fasteners or a similar connector that is tough and shock resistant. An exemplary fastener, could be a ratcheted connector that engages grooves along the central body while being connected to the ring, such as with screws to the ring, holding the ring in a tight fit against the central body using the ratcheted construction. The ring can be flexibly connected to the central body in another embodiment using a tension connection much the way a rubber band can be wound around a rod for a secure fit.

The ring is contemplated to have a diameter that is larger than the diameter of the central body, smaller than the diameter of the anvil end, and approximately the same diameter as the tapered end.

The ring is contemplated to be made from the same material as the central body, in a first embodiment, such as steel, if the central body is made of steel. However, it is contemplated that the ring can be of a different material, such as a hard rubber fastened to the central body or a different metal.

The ring is contemplated to have a thickness which is from about $\frac{1}{8}^{th}$ of an inch in thickness to about 2 inches in thickness depending on the needs of the user of the device, a thicker ring supports a thinner walled pipe during installation, while a thinner ring supports a thicker walled pipe for installation.

Water pipe for installation is slid over the tapered end, the central body, and the ring surrounding the central body forming a tight fitting sleeve.

A benefit of these embodiments is that thin, lightweight water pipe can be installed quickly and snugly over the tool. Therefore, when using the tool a less expensive, lightweight water pipe can be installed beneath a nonmoving object; rather than having to use a heavier, more expensive, water pipe so that it could sustain direct impact during installation.

The water pipe and tool combination can be directly hammered beneath the nonmoving object, or in an alternative embodiment, the water pipe and tool combination can be placed in a pre-dug channel or trench adjacent to a nonmoving object, with the tapered end pointing beneath the nonmoving object. The anvil end is then impacted moving the tapered end forward beneath the nonmoving object. The impacting can be manually with a hammer, for use in low income areas, or it can be quickly installed using a packer, other electrical, mechanical, pneumatic or hydraulic device to drive the tool and water pipe combination into the earth beneath the nonmoving object.

After impacting, the tapered end of the tool becomes visible or accessible on the other side of the nonmoving object, such as a concrete walkway, revealing successful installation of the water pipe.

Figure 6:
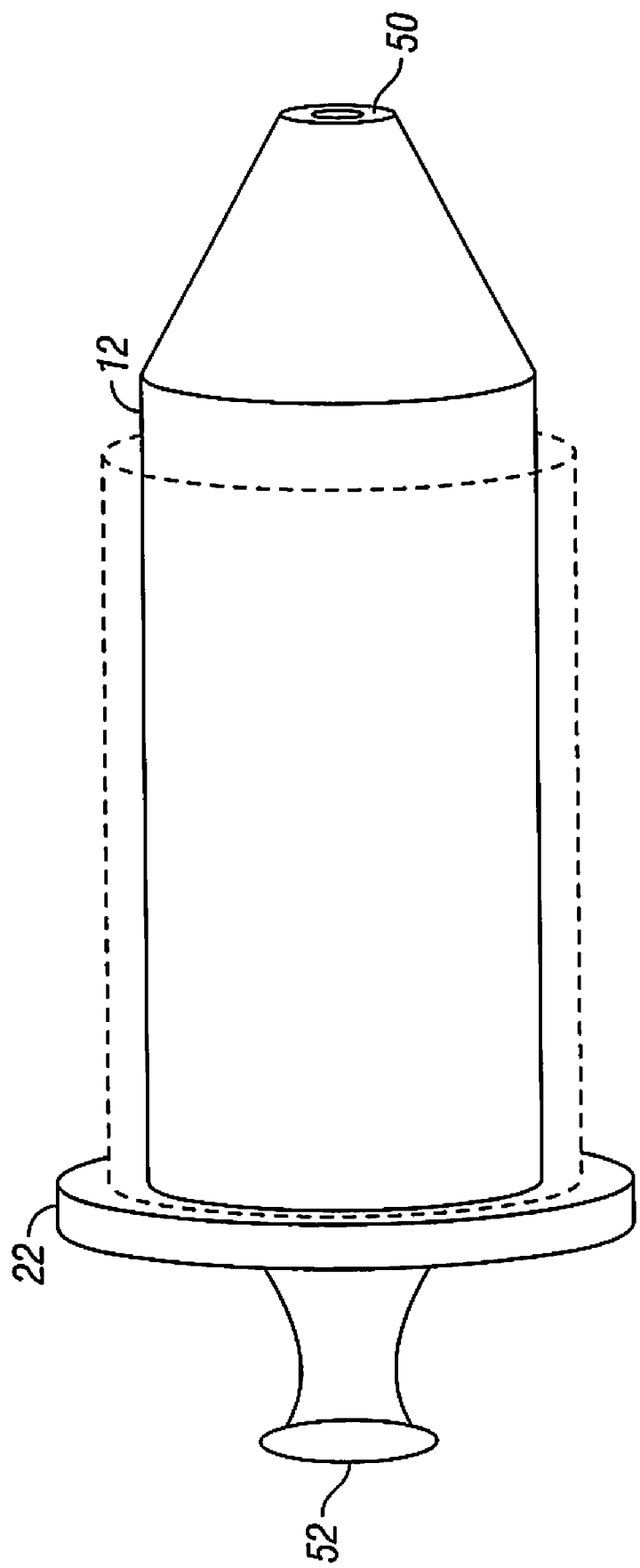
FIG. 6 shows a cross section of an hollow body embodiment of the tool.

The tool is seized at the anvil end, shown in FIG. 6 having a gripping portion, and pulled from within the water pipe, leaving the water pipe in the ground successfully installed beneath the nonmoving object.

A connection to an existing water supply can then be made or welded to the ends of the installed water pipe, forming a landscape irrigation system or other water system, a sewage system, a potable drinking system or even a septic tank system.

The present embodiments save significant time in installing water pipe.

The embodiments also save on labor costs because the time to install a water pipe is dramatically reduced, and the installation of a water pipe is made easier without having to break concrete and then remake a walkway.

Additionally, these embodiments prevent common injuries that occur on the job using known drilling and boring techniques for pipe installation under concrete walkways. The tool results in a safer workplace without carbon monoxide exhaust, or the need for additional water for lubrication, which for desert regions is difficult to find and wasteful to use.

The present embodiments only require one person to install a water pipe. Whereas, traditionally at least two or three people are required for the installation of water pipe with conventional boring and drilling techniques.

The embodiments save time during installation by at least 50%, because the tool can pull the dirt from the water pipe. Therefore, the embodiments do not require cleaning out of dirt from the inside of the installed water pipe, which occurs with water pipe installations that use drilling or boring machines.

The embodiments are dramatically less expensive than conventional boring, because expensive drill bits, as required with a drill, are not needed with the process. Simple manual whacking of the anvil end with a sledge hammer will suffice for installation of the tool under the immovable structure. For a normal household walkway, as few as about 15 to 18 whacks on the anvil end will successfully install the water pipe for a 4 foot sidewalk. Although packers can be used, in an embodiment, no gas powered packers are needed although they can be desirable for use when installing very large diameter water pipes.

In an embodiment, this tool is contemplated as being lightweight, which enables low shipping costs, for shipping of the tool; conserving fuel; and the added feature that one person can lift and carry the tool.

The embodiments can be used in particular, for the installation of water sprinkler systems for houses and office buildings.

An embodiment contemplates additionally digging a narrow trench at an angle to the nonmoving object under which the water pipe is to be installed. This narrow trench can be between about 1 foot to about 4 feet wide depending on the diameter of the tool needed and diameter of the water pipe desired for installation. This narrow trench might be from about 20 degrees to about 90 degrees from the edge of the nonmoving object under which the water pipe is to be installed.

During installation the anvil end of the water pipe and tool assembly is repeatedly hit with a manual hammer, or an electrical packer, such as a jack hammer. Manual installation can be accomplished in as little as 15 to 18 strokes. During installation flexible conduit, such as electrical wire, a chain, a string, rope, a flexible water conduit, a electrical tubing, a hose, can be simultaneously installed. Thereby, accomplishing two tasks in one. Alternatively, the water pipe can be installed using the tool, and before the tool is removed from the installed water pipe the flexible conduit can be connected to the tool. Allowing the flexible conduit to then be pulled through the installed water pipe, forming a fast two-step process.

Referring now to the drawings, FIG. 1 shows the tool 10 for installing water pipe. The tool is made of a central body 12, with an axis 14, and a central body diameter 16, which is referred to herein as the first diameter 16.

The tool has a tapered end 18 having at its largest cross section, a tapered end diameter 20, which is referred to herein as the second diameter 20, and wherein the second diameter 20 is larger than the first diameter 16.

The tool has an anvil end 22 connected to the central body 12. Wherein, the anvil end 22 has at its largest cross section, an anvil end diameter 24, which is referred to herein as the third diameter 24; and wherein the third diameter 24 is larger than the second diameter 20.

A ring 26 surrounds the central body 12 between the tapered end 18 and the anvil end 22. This ring having a ring diameter 28 which is referred to herein, as the fourth diameter 28. The fourth diameter 28 is greater than the first diameter 16. The fourth diameter 28 is equal to the second diameter 20. The fourth diameter 28 is less than the third diameter 24.

This formed tool can receive water pipe 30 over the tapered end and ring, contacting the anvil end 22. The water pipe 30 has an inner diameter forming a gap 32 between the central body and the inner diameter of the water pipe. In an embodiment, this gap 32 can be from about 1/16 of an inch to about 3/4 of an inch between the central body 12 and the water pipe 30. The tighter the fit of the water pipe 30, the less material enters the water pipe 30.

Figure 2:
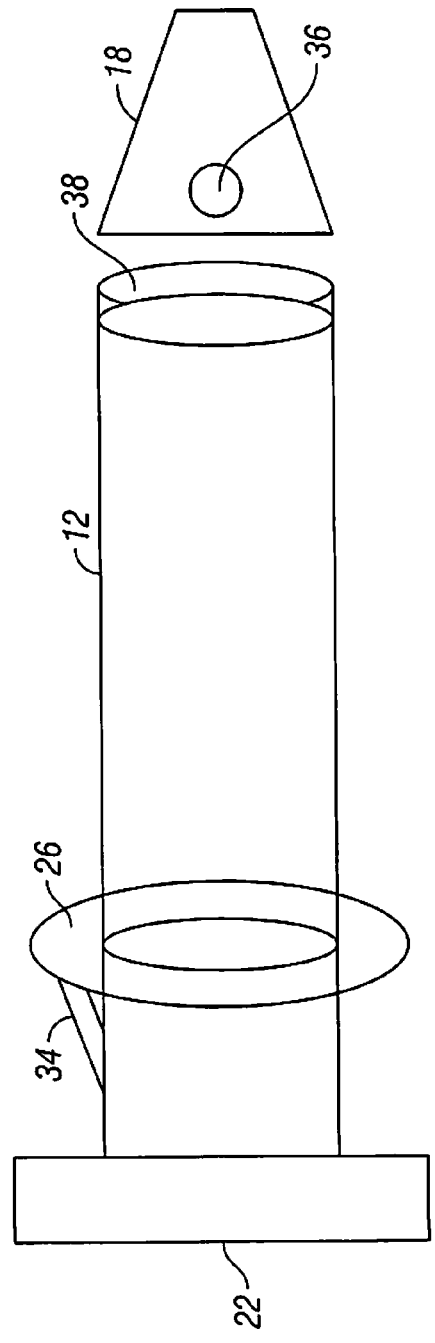
FIG. 2 depicts a top view of another embodiment of a tool in a position ready for use in an installation wherein the tool is adjustable and a hole is in a blunt tapered end.

The tool 10 of FIG. 1, is shown as a one piece tool. FIG. 2 shows a tool 10, wherein the ring 26 is adjustable along the central body 12 wherein the central body 12, tapered end 18, and anvil end 22 are a one piece unit. In yet another embodiment, the tapered end 18 is removable and replaceable for improved versatility, and for selective maintenance, in case a tapered end 18 is damaged.

The ring 26 can be fastened to the central body 12 using a fastener 34, such as a ratcheting fastener. The water pipe fits over the tapered end 18 and the ring 26 in a snug fit preventing particles of dirt from packing between the pipe and the central body 12.

In an embodiment, the anvil end 22 can have a diameter of at least 2 inches and a thickness sufficient to sustain repeated impact without deformation. Additionally, tapered end 18 can be threaded onto the central body 12, using threads 38 for ease of replacement or to allow for selective attachment of a tapered end 18 with a different second diameter 20, thereby, selectively creating a tapered end 18 with a different second diameter 20 for selective use with different kinds of water pipe or in different types of soil.

In another embodiment, it is contemplated that the fourth diameter 28 and the third diameter 24 are the same size, or of equal diameters.

In another embodiment, it is contemplated that the fourth diameter 28 and the second diameter 20 are substantially identical diameters and less than the third diameter 20.

In both FIG. 1 the tapered end 18 is shown having a conical shape tapering to a point. Whereas in FIG. 2; the tapered end 18 is shown having a conical shape and tapering to a blunt end.

Moving onto FIG. 2, the tapered end 18 is shown having a hole 36 for removably securing a flexible elongated element, such as electrical wires, to the tool 10. Once the water pipe is installed, and the tapered end 18 is accessible from under the immovable structure, the wires can be connected to the hole 36, the tool 10 can be pulled from the water pipe, enabling the tool 10 to pull electrical wires after installing the water pipe.

It is contemplated that the hole 36 in the tapered end 18 can have a diameter from about 1/16 of an inch to about 2/3 of an inch.

In addition, the tool 10 can further comprise a hole, not shown, selectively deposed upon the central body 12 along the axis 14, parallel to axis 14, or perpendicular to the axis 14 enabling the selective connecting of a flexible elongated element prior to sliding the water pipe 30 over the tapered end 18 and central body 12, enabling simultaneous installation of flexible elongated conduit during installation of the water pipe.

It is contemplated that the hole, not shown, deposed upon central body 12 can have a diameter from about 1/4 of an inch to about 2 inches.

Both FIG. 1 and FIG. 2 depict the ring 26. This ring 26 can be made of a shock absorbing material such as a rubber gasket, a polymer ring, like a plastic ring of polypropylene, a metal ring made of steel, tool steel, carbon steel or similar tough, hard metal, a laminate of metal, plastic, rubber or combinations thereof, a material identical to other portions of the tool 10, or combinations of these components.

FIG. 3 shows an exploded cross section of, yet, another embodiment of the central body 12 and tapered end 18. In FIG. 3, the central body 12 has an inner chamber 40 extending through at least a portion of the central body 12. This inner chamber 40, in another embodiment can extend most of the way through the central body 12, creating a lightweight tool 10. The tapered end 18 can also have a tapered end inner chamber 41 enabling both portions of the tool 10 to be lightweight. In the embodiment of FIG. 1, the tool 10 is shown with all portions of the tool 10 as solid. In the embodiment of FIG. 6, the tool 10 is shown have a hollow central body 12 with a hollow opening 50 of tool 10 also has a gripping portion 52 for ease of removal of the tool from the installed water pipe 30.

FIG. 4 shows an embodiment wherein the central body 12 is curved and formed from two removably connectable segments segments 42 and 44. These removably connectable segments 42 and 44 can have segment threads 46 for connecting the two removably connectable segments 42 and 44 together. The central body 12 of this embodiment can have a plurality of identically sized removably connectable segments threaded together.

In another embodiment, the tool 10 can have a central body 12 with a plurality of telescoping, nested members, so that the central body 12 can be very compact in two or more parts, nesting together for shipping, and then at a site, the nested segments can be pulled out, like a telescope, and twisted together on threads to create a stiff, usable tool 10. Three nesting segments are contemplated as being highly versatile and usable herein.

In still another embodiment, fasteners can be used on each removably connectable segment 42 and 44 for connecting the at least two removably connectable segments 42 and 44 together instead of threads, such as ratchet and groove fasteners.

Figure 5:
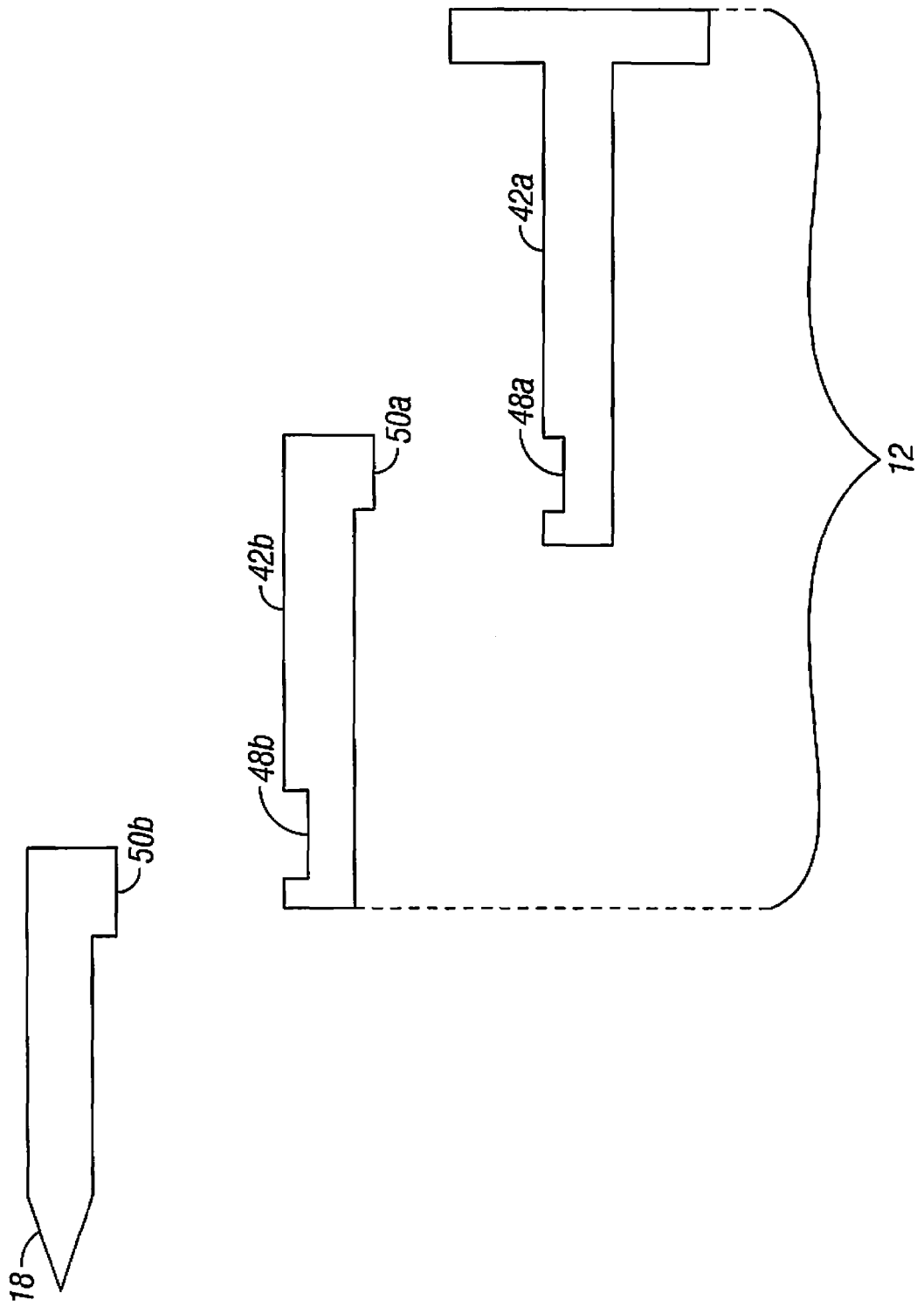
FIG. 5 depicts a cross sectional view of another embodiment of the tool having an interlock mechanism for fastening portions of the central body together.

FIG. 5 shows an embodiment wherein alternating removably connectable segments 42a and 42b each comprise an interlock depression 48a and 48b for engaging interlock heads 50a and 50b disposed upon adjacent removably connectable segments 44a and 44b or on the tapered end 18.

Returning to FIG. 1, a transmitter 52 is contained within the tapered end 18, enabling tracking of the tool 10 using a global positioning system. An example of a transmitter that could be used, is a miniature transmitter like the MT-2 (Mole) designed to be used in conjunction with the MAC-51Bx Receiver sold by Schonstedt Instrument Company of Kearneysville, West Va. There are many other transmitters available, and the MT-2 (Mole) is only a, non-limiting, example.

In an embodiment, the tapered end 18 and ring 26 have an outer diameter from about ½ of an inch to about 2 and ½ inches.

The tool 10 is contemplated, at least one embodiment, to be used on a water pipe made of a polyvinyl chloride (PVC), another hard crystalline polymer such as a polyamide composite, a metal, or a coated metal resistant to rusting and corrosion can be used.

The central body 12 is contemplated to have an overall length of about ½ of a foot to about 100 feet depending on the length of the water pipe or other general pipe needed for installation.

For example, a long thin water pipe with ¼ inch inner diameter and 80 feet long can be usable with a long, thin tool with a 90 foot long central body 12 and a fourth diameter 28 only slightly less than the diameter of the ¼ inch water pipe. The central body 12 plus tapered end 18 should be slightly longer than the water pipe needed for installation. It is contemplated that for this embodiment, this length can be from about 5 percent to about 15 percent longer than the water pipe to be installed. The central body 12 of the tool 18 can be extended by using multiple segments or elements of the central body 12, connected together. These connections can be removable connections in one embodiment, or the tool 10 can be made with a unitary, non-disassemble central body section 12.

The wall thickness of a water pipe can be from about 1/16 inch to over 2 inches in thickness for most water uses, but this wall thickness can be varied depending on the needs of the landowner, the pressure needed in the water pipe, or other specification such as a thicker wall if the water or irrigation system is in an earthquake zone, or if the water pipe needs to traverse soil with bits of granite.

In one embodiment, a 4.5 foot pipe with a 1 inch diameter of PVC can be installed over the tool 10 with central body 12 having a first diameter 16, a ring 26 mounted around the central body 12 having a diameter only slightly smaller than the diameter of the pipe. The central body 12 and tapered end 18 present a length only slightly longer than the pipe, such as a length of about 5 feet. For this embodiment, the anvil end 22 is about 2½ inches in diameter and has a thickness of about 1½ inches. The anvil end 22 is welded to the central body 12, the ring 26 is welded to the central body 12, the tapered end 18 is welded to the central body 12, but the central body 12 is formed of two portions that can be selectively and removably threaded together. The anvil end 22 can be made of stainless steel, and the central body 12 can be made from a different material, such as carbon steel. It should be noted that the central body 12 and the anvil end 22 can be made of the same material, so long as the material is not easily deformable upon impact from a sledge hammer. Other usable materials include cold rolled steel, iron, alloys thereof, or stainless steel. For this embodiment, a 1 inch tapered end 18 that tapers to a point with about a 20 degree slope can be used. It should be noted that the tapered end 18 can used can selectively be of other shapes, including blunt ends with only some tapering. The tapered end 18 can be made from the same material as the central body 12.

Another embodiment contemplates that the tapered end 18 can be removably attached by fasteners or by a threadable engagement to a tapered end 18 with selective differing diameters to be operatively usable on a central body 12. This feature adds versatility to the invention. This feature also enables easy replacement in the field if the tapered end 18 should become damaged from inadvertent impact with granite or another substance that deforms the tapered end 18.

The central body 12 and tapered end 18 can be made of a high impact, ultraviolet resistant, non-corroding material comprising a polymer, a graphite, a ceramic, or combinations thereof. The tapered end 18 can be made of a material different from the central body 12, such as a graphite composite. A diamond point can be installed as the tapered end 18 for use when difficult penetration of soil with high density is required.

The anvil end 22 can have a flat face on the side opposite the central body 12. The anvil end 22 can have a thickness which enables the anvil end 22 to sustain repeated impacts, of at least 20 pounds per square inch, without deformation. Alternatively the anvil end 22 can have a curved face, with a depression to reduce accidents on the job during installation that result from the user missing the intended target. The anvil end 22 in still another embodiment could have a face shaped to engage the face of a jack hammer so that again, accidents on the job during installation are dramatically reduced and installation is quick.

In still another embodiment, the anvil end 22 is thick enough, made of a material strong enough, and is brittle resistant enough to endure at least 200 pound per square inch during installation.

The tool 10 can be made from paint coated metals to inhibit rusting during daily field use and routine exposure to weather.

The tool 10 can be coated with a white oil or an easily degradable non-toxic lubricant, such as a vegetable oil, to assist in the prevention of corrosion while enabling otherwise snug fitting piping to slide off the tool 10 easily after installation and pounding is complete. This type of non-toxic coating enables the tool 10 to be more environmentally friendly during use.

In another non-limiting embodiment, the tool 10 can have a first diameter 16 from less than about 1 inch to about 2 inches.

In another alternative but non-limiting embodiment, the tool 10 contemplates that the anvil end 22 is welded to the central body 12 at an angle that is substantially perpendicular to the central body 12.

It is contemplated that the anvil end 22 can have a third diameter 24 up to about 3 times greater than the diameter of the ring, such as a diameter of from about 2 inches to about 4 inches.

In another alternative but non-limiting embodiment, it is contemplated that the anvil end 22 is cylindrical in shape.

These alternative but non-limiting embodiments, enable an average 160 pound man in decent shape to install a 4.5 foot and 1 inch diameter PVC water pipe in gumbo soil, such as the kind in Houston, Tex., in about 60 seconds using the tool 10 and a sledge hammer.

FIG. 6 shows an alternative non-limiting, embodiment of the tool 10 for installing water pipe. Wherein, the tool 10 has a hollow central body 12, having a hollow opening 50 along an axis having a first diameter 16; an anvil end connected to the central body 12 having a gripping portion 52; and wherein the tool 10 is adapted to receive a water pipe 30 around the central body 12. The water pipe 30 is installed beneath a non moving object by impacting the anvil end 22 of the tool 10; thereby, running the tool 10 with water pipe 30 beneath the nonmoving object filling the hollow central body 12 with dirt. After installation is complete, the tool 10 is removed from the water pipe 30 using the gripping portion 52, leaving an essentially dirt free water pipe 30 installed beneath the non moving object.

While these embodiments have been described with emphasis on the embodiments, it should be understood that within the scope of the appended claims, the embodiments might be practiced other than as specifically described herein.

What is claimed is:

1. A tool for installing water pipe comprising:
   a. a central body with an axis having a first diameter;
   b. a tapered end having a second diameter larger than the first diameter;
   c. an anvil end connected to the central body having a third diameter larger than the second diameter; and
   d. a ring encircling the central body between the tapered end and the anvil end having a fourth diameter greater than the first diameter, wherein the fourth diameter is equal to the second diameter and the fourth diameter is less than the third diameter; enabling water pipe to slide over the tapered end and ring contacting the anvil end forming a gap of between ½ inch and ¾ inch between the central body and the water pipe, and wherein the tool is adapted to install water pipe in the ground beneath immovable structures.

2. The tool of claim 1, wherein the tool is a one piece tool.

3. The tool of claim 1, wherein the ring is adjustable along the central body and the central body, tapered end and anvil end are a one piece unit.

4. The tool of claim 1, wherein the water pipe fits over the tapered end and the ring in a snug fit preventing particles from packing between the water pipe and the central body.

5. The tool of claim 1, wherein the anvil end comprises a diameter and a thickness sufficient to sustain repeated impact without deformation.

6. The tool of claim 1, wherein the fourth diameter and the third diameter are equal.

7. The tool of claim 1, wherein the tapered end has a conical shape.

8. The tool of claim 1, wherein the tapered end further comprises a hole for removably securing a flexible elongated element thereto enabling the tool to pull the element simultaneously while installing water pipe.

9. The tool of claim 1, wherein the flexible elongated element comprises a wire, a chain, a string, a rope, a flexible water conduit, a electrical tubing, a hose, or a combination thereof.

10. The tool of claim 1, wherein the ring comprises a shock absorbing material, wherein the shock absorbing material is a rubber gasket, a polymer ring, a metal ring, a laminate of metal, plastic, rubber, a material identical to other portions of the tool, or combinations thereof.

11. The tool of claim 1, wherein the central body comprising an inner chamber extending through at least a portion of the central body.

12. The tool of claim 1, wherein the central body is curved.

13. The tool of claim 1, wherein the central body is an adjustable length central body comprising at least two removably connectable segments.

14. The tool of claim 13, wherein the removably connectable segments comprises threads for connecting the at least two removably connectable segments together.

15. The tool of claim 13, further comprising fasteners disposed on each of the at least two removably connectable segments for connecting the at least two removably connectable segments together.

16. The tool of claim 13, wherein alternating removably connectable segments each comprising an interlock depression for engaging interlock heads disposed upon adjacent removably connectable segments.

17. The tool of claim 1, wherein the tapered end further comprises a hole for removably securing a flexible elongated element to the tool after installing the water pipe to pull the flexible elongated element through the installed water pipe.

18. The tool of claim 1, wherein the tapered end contains a transmitter enabling a global positioning system to identify a location of the tool.

19. The tool of claim 1, wherein the tapered end and ring have an outer diameter from about 0.5 inch to about 2.5 inches.

20. A tool for installing water pipe comprising:
   a. a hollow central body, having a hollow opening along an axis having a first diameter;
   b. an anvil end connected to the central body having a gripping portion; and
   wherein the tool is adapted to
   receive a water pipe around the hollow central body;
   install the water pipe beneath a non moving object by impacting the anvil end of the tool, thereby running the tool with water pipe beneath the nonmoving object and filling the hollow central body with dirt; and
   be removed from the water pipe using the gripping portion, leaving an essentially dirt free water pipe installed beneath the non moving object.

21. The tool of claim 20, further comprising a hollow tapered end connected to the hollow central body forming a continuous conduit along the axis of the hollow central body.

* * * * *